No. 624,572. Patented May 9, 1899.
W. J. STURGESS.
CLIP FOR VELOCIPEDE SADDLES.
(Application filed Mar. 31, 1898.)
(No Model.) 2 Sheets—Sheet 1.
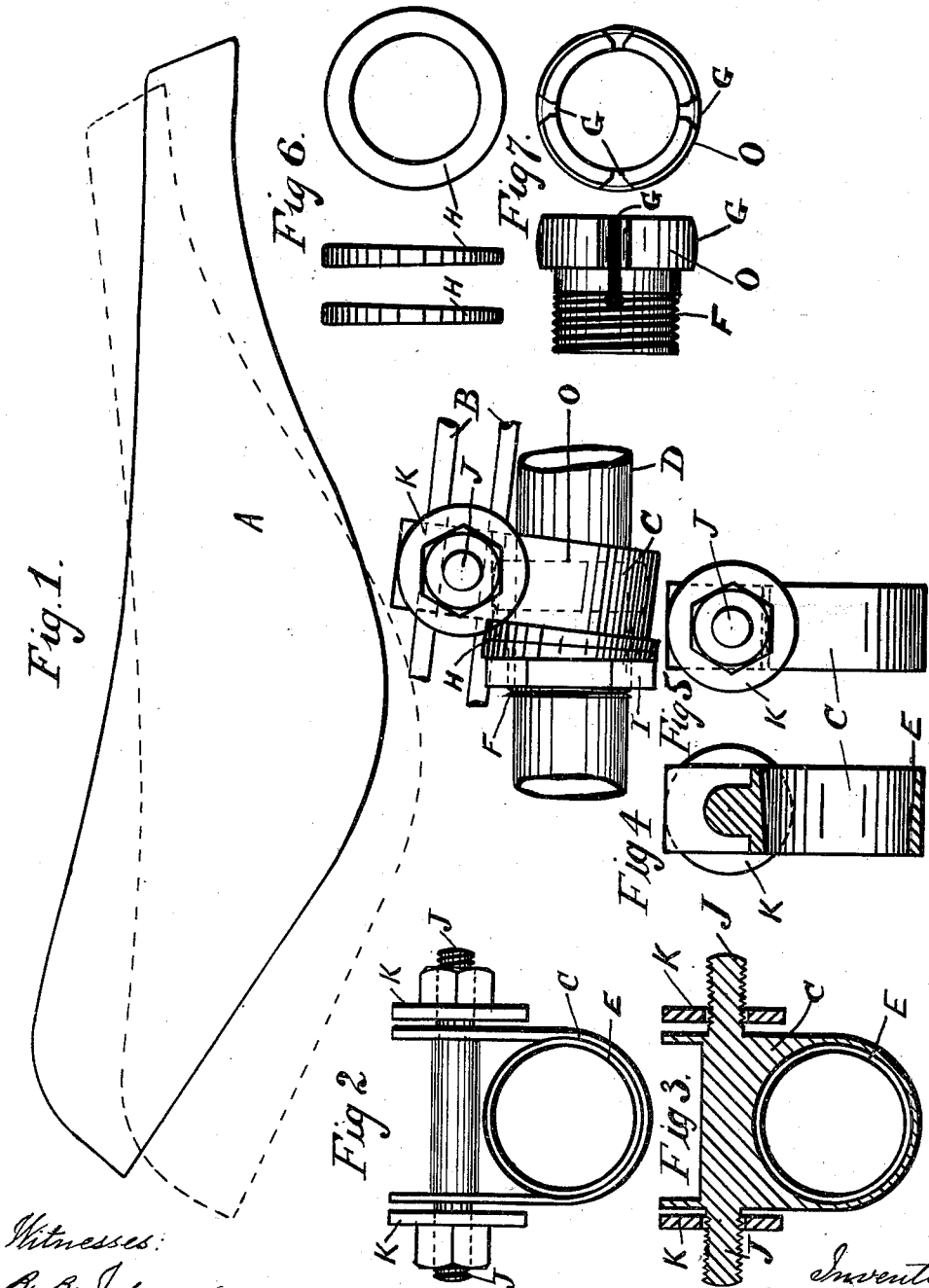
Witnesses:
R. R. Johnson
Geo. H. Bliss Jr.
Inventor.
Wm. J. Sturgess.
by Herbert H. T. Jenner.
Attorney.

No. 624,572. Patented May 9, 1899.
W. J. STURGESS.
CLIP FOR VELOCIPEDE SADDLES.
(Application filed Mar. 31, 1898.)
(No Model.) 2 Sheets—Sheet 2.
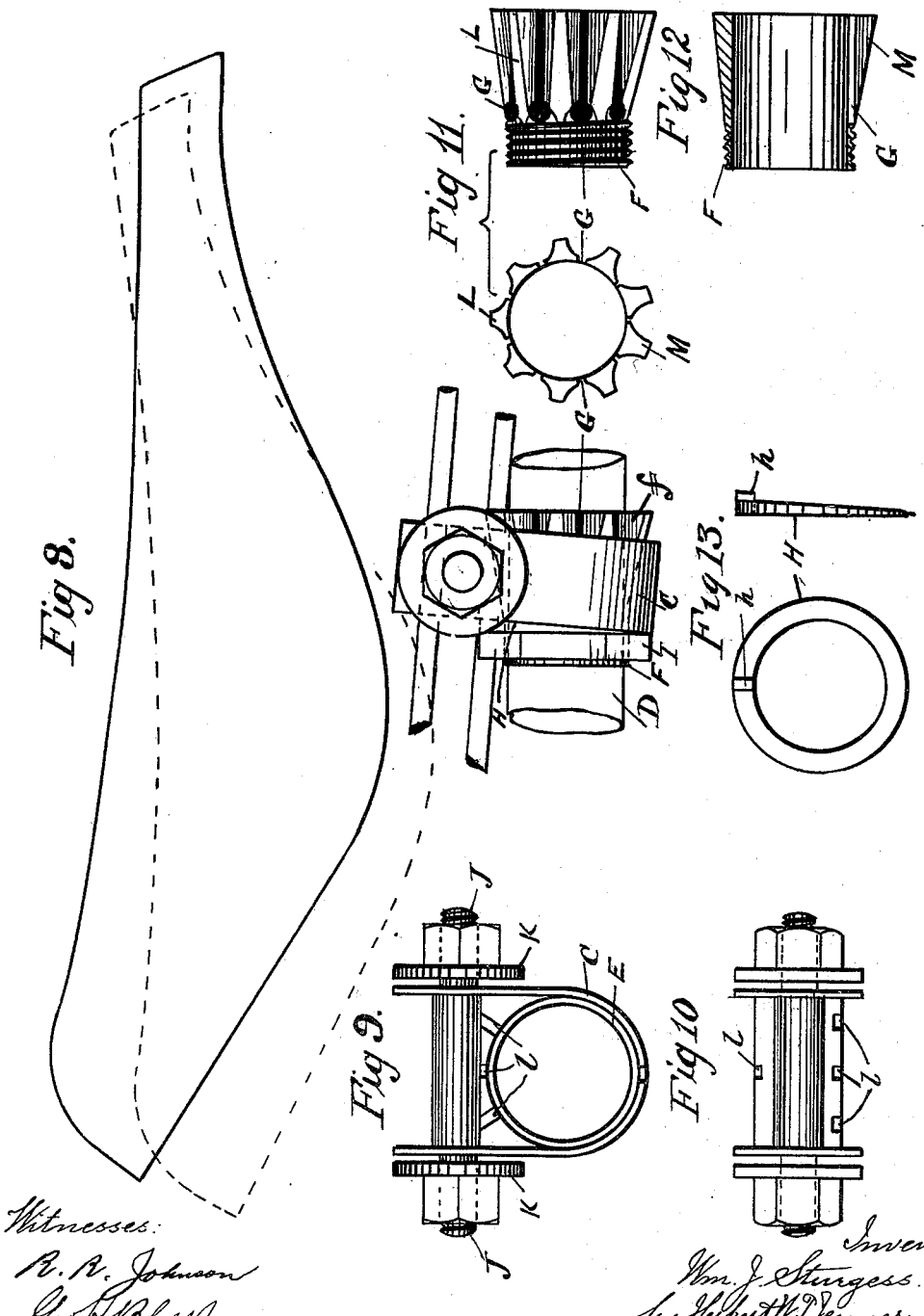

UNITED STATES PATENT OFFICE.

WILLIAM JETHRO STURGESS, OF BIRMINGHAM, ENGLAND.

CLIP FOR VELOCIPEDE-SADDLES.

SPECIFICATION forming part of Letters Patent No. 624,572, dated May 9, 1899.

Application filed March 31, 1898. Serial No. 675,944. (No model.)

*To all whom it may concern:*

Be it known that I, WILLIAM JETHRO STURGESS, a subject of the Queen of Great Britain and Ireland, residing at 47 Camp Hill, Birmingham, in the county of Warwick, England, have invented certain new and useful Improvements in Clips for Velocipede-Saddles; and I do hereby declare the following to be a full, clear, and exact description of the invention, such as will enable others skilled in the art to which it appertains to make and use the same.

My invention relates to improvements in clips for velocipede-saddles, and has for its object to provide means whereby such saddles may be firmly and expeditiously attached to the saddle-bar and may be tilted backward or forward, as desired, to suit the rider. I attain these objects by the means illustrated in the accompanying drawings, in which—

Figure 1 is a side elevation of a velocipede-saddle attached to the saddle-bar by my improved clip. Fig. 2 is a front elevation, and Fig. 3 a vertical section, of the same clip detached from the saddle. Figs. 4, 5, 6, and 7 are detailed views of the same clip. Fig. 8 is a front elevation of a velocipede-saddle attached to the saddle-bar by a clip a little longer than that shown at Fig. 1, and Figs. 9 to 14 are detailed views of the same clip.

Similar letters refer to similar parts throughout the several views.

The saddle A is supported by a spring wire frame B, which is broken off for the purpose of showing the clip clearly.

D is a portion of the saddle-bar.

C is the body of the clip, having a taper-hole E. (Shown at Figs. 2, 3, and 4.) The screw-socket F (shown separately at Fig. 7) is slit at G, so as to enable it to expand or contract, one of the slits extending through the entire length. The said socket is placed on the saddle-bar D, the extended part O taking into the taper part E, which tilts the body of the clip C diagonally, as shown at Fig. 1, also the saddle in dotted lines. The position may be reversed by withdrawing the extended end G of the said screw-socket and placing it in the body tilted in the reverse direction. The taper-washers H H (shown at Fig. 6) are placed over the screw-socket F and fix the body in its diagonal position. The nut I being screwed up closes the extended part O on the saddle-bar D, thus fixing the saddle in any desired position in a most accurate way. The screw-shanks J J and the washers K K secure the said clip to the spring-frame B.

The tilting clip C can be placed at any desired angle upon the rounded enlargement G, and it is then secured in the desired position by means of one or more tapered washers H, which can be turned around on the socket, and the nut I.

In the modification shown in Figs. 8 to 13 the screw-threaded socket has an enlargement *f*, which is conical and thicker on one side M than on the other side. The clip C does not tilt in this form of the device; but the socket is turned around on the saddle-bar, so as to place the socket at any desired angle. The tapered washer H has a lateral projection *h*, which engages with one of the notches *l* on the clip and prevents the washer from turning when the nut I is turned to tighten the socket on the saddle-bar.

The screw-threaded socket (shown in detail in Fig. 11) is split and grooved longitudinally, so as to be contractible. When this socket is placed on the saddle-bar with the thick side M downward, the tapered washer H is used to make a suitable bearing for the nut. When the nut is tightened, it contracts the socket and clamps it on the saddle-bar and also secures the clip on the socket. The socket can be secured in any position by using a washer of appropriate taper or by using two tapered washers, the same as shown in Fig. 4 and hereinbefore described, and turning one of the said washers around until a suitable bearing for the nut is formed.

When the thick side M of the socket F is turned uppermost, a washer of appropriate taper is inserted between the nut I and the end of the clip C, so as to give the nut a good bearing; but no washer is required when the thick side M is so proportioned as to permit the end of the clip C to lie parallel with the adjacent face of the nut I.

What I claim is—

1. The combination, with a saddle-bar, of a screw-threaded socket supported by the said bar and provided with an enlargement, a saddle-clip arranged at an angle with respect to the saddle-bar and provided with a tapered hole which engages with the said enlargement, a tapered washer bearing against the clip around the smaller end of its hole, and a nut engaging with the said socket and bearing against the said washer, substantially as set forth.

2. The combination, with a saddle-bar, of a screw-threaded socket supported by the said bar and provided with a rounded enlargement, a saddle-clip arranged at an angle with respect to the saddle-bar and provided with a tapered hole engaging with the said enlargement, a tapered washer bearing against the clip around the smaller end of its hole, and a nut engaging with the said socket and securing the clip on the enlargement, substantially as set forth.

3. The combination, with a saddle-bar, of a screw-threaded socket supported by the said bar and provided with a rounded enlargement, a saddle-clip provided with a tapered hole and adjustable at different angles upon the said enlargement, a nut engaging with the said socket and securing the clip on the enlargement, and a pair of tapered washers revoluble on the said socket before the nut is screwed up and arranged between the nut and the clip, substantially as described and shown.

In testimony whereof I affix my signature in presence of two witnesses.

WILLIAM JETHRO STURGESS.

Witnesses:
WILLIAM HENRY BARACLOUGH,
HEBER EDWIN HOWARD.